US008897205B2

(12) United States Patent
Tajima et al.

(10) Patent No.: US 8,897,205 B2
(45) Date of Patent: Nov. 25, 2014

(54) MOBILE COMMUNICATION SYSTEM, RELAY CONTROL METHOD, RELAY STATION APPARATUS, AND BASE STATION APPARATUS

(75) Inventors: Yoshiharu Tajima, Kawasaki (JP);
Yoshinori Tanaka, Kawasaki (JP);
Yoshihiro Kawasaki, Kawasaki (JP);
Yoshiaki Ohta, Kawasaki (JP);
Katsumasa Sugiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 206 days.

(21) Appl. No.: 13/607,973

(22) Filed: Sep. 10, 2012

(65) Prior Publication Data
US 2013/0003586 A1    Jan. 3, 2013

Related U.S. Application Data

(63) Continuation of application No. PCT/JP2010/054249, filed on Mar. 12, 2010.

(51) Int. Cl.
*H04W 4/00* (2009.01)
*H04W 74/08* (2009.01)
*H04B 7/155* (2006.01)
*H04W 48/20* (2009.01)
*H04W 76/02* (2009.01)
*H04W 84/04* (2009.01)

(52) U.S. Cl.
CPC .............. *H04W 74/08* (2013.01); *H04B 7/155* (2013.01); *H04W 48/20* (2013.01); *H04W 76/02* (2013.01); *H04W 84/047* (2013.01)
USPC ........... 370/315; 370/328; 370/492; 370/501; 455/11.1

(58) Field of Classification Search
None
See application file for complete search history.

(56) References Cited

U.S. PATENT DOCUMENTS 7,889,713 B2    2/2011    Zheng et al.
8,126,470 B2    2/2012    Zheng
(Continued)

FOREIGN PATENT DOCUMENTS

| JP | 2007-143138 | 6/2007 |
| JP | 2009543399 | 12/2009 |
| JP | 2010016420 | 1/2010 |
| JP | 2010-50855 | 3/2010 |

OTHER PUBLICATIONS

Japanese Office Action dated Feb. 12, 2014, from the corresponding Japanese Application No. 2012-504254.

(Continued)

*Primary Examiner* — Donald Mills
(74) *Attorney, Agent, or Firm* — Katten Muchin Rosenman LLP

(57) ABSTRACT

A mobile communication system includes a base station, a mobile station, and a relay station. The mobile station includes a transmitter transmitting a random access request to the base station. The relay station includes a transmission information acquisition unit receiving a random access response from the base station and acquiring transmission information of a connection establishment request out of the random access response, and a relay report unit measuring a received state of the connection establishment request and transmitting relay information including the received state to the base station and the base station includes a comparison determinator comparing a received state of the connection establishment request measured by the base station with a measurement information of the received state in the received relay information and determining whether the relay station is used to relay radio communications with the mobile station.

8 Claims, 8 Drawing Sheets

(56) References Cited

U.S. PATENT DOCUMENTS

| 8,194,584 | B2 | 6/2012 | Nakatsugawa | |
|---|---|---|---|---|
| 2007/0110016 | A1 | 5/2007 | Shen et al. | |
| 2010/0238854 | A1* | 9/2010 | Kazmi et al. | 370/315 |
| 2010/0302946 | A1* | 12/2010 | Yang et al. | 370/235 |
| 2010/0315957 | A1* | 12/2010 | Koo et al. | 370/246 |

OTHER PUBLICATIONS

International Search Report dated Jun. 15, 2010 for International Application No. PCT/JP2010/054249.

"3rd Generation Partnership Project; Technical Specification Group Radio Access Network; Requirements for Evolved UTRA (E-UTRA) and Evolved UTRAN (E-UTRAN)(Release 7)", 3GPP TR 25.913 v7.3.0, Mar. 2006.

"3rd Generation Partnership Project; Technical Specification Group Radio Access Network; Requirements for further advancements for Evolved Universal Terrestrial Radio Access (E-UTRA) (LTE-Advanced)(Release 8)", 3GPP TR 36.913 v8.0.1, Mar. 2009.

"Part 16: Air Interface for Fixed and Mobile Broadband Wireless Access Systems, Multihop Relay Specification", IEEE Computer Society and IEEE Microwave Theory and Techniques Society, May 30, 2008.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300 v8.8.0, Mar. 2009.

\* cited by examiner

US 8,897,205 B2

MOBILE COMMUNICATION SYSTEM, RELAY CONTROL METHOD, RELAY STATION APPARATUS, AND BASE STATION APPARATUS

CROSS-REFERENCE TO RELATED APPLICATION

This application is a continuation application of International Application PCT/JP2010/054249 filed on Mar. 12, 2010 and designated the U.S., the entire contents of which are incorporated herein by reference.

FIELD

The embodiment discussed herein is related to a mobile communication system, a relay control method, a relay station apparatus, and a base station apparatus.

BACKGROUND

In a mobile communication system for cellular phones, a cellular method is generally used where a base station covers a wide area by combining plural areas (cells) which are ranges where the base station may transmit and receive data to and from a mobile station located therein, and the mobile station may change the base station to be communicated with from one to another while moving.

Recently, the third-generation mobile communication services based on the Direct Sequence Code Division Multiple Access (DS-CDMA) method have been provided. On the other hand, research and development has been actively studied for a next-generation mobile communication scheme that may provide faster communications.

In the 3rd Generation Partnership Project (3GPP), the Long Term Evolution (LTE) has been studied to start its services (see, for example, 3GPP TR25.913 V7.3.0). Further, the LTE-advanced which is an updated version of the LTE has also been studied (see, for example, 3GPP TR36.913 V8.0.1). Further, in the LTE-advanced, a relay station (relay) may be used so as to improve the throughput and characteristics in a skip zone.

In the 3GPP, as configurations of the relay station, it has been considered that the relay station may operate similar to a base station in a normal state and the existence of the relay station may not be recognized by a mobile station. The former configuration is called "Type1" and the latter configuration is called "Type2".

SUMMARY

According to an aspect of the present invention, a mobile communication system includes a base station, a mobile station, and a relay station relaying radio communications between the base station and the mobile station. The mobile station includes a transmitter transmitting a random access request to the base station. The relay station includes a transmission information acquisition unit receiving a random access response transmitted from the base station in response to the random access request, and acquiring transmission information of a connection establishment request to be transmitted by the mobile station out of the received random access response, and a relay report unit measuring a received state of the connection establishment request based on the transmission information, and transmitting relay information including measurement information of the received state to the base station. The base station includes a comparison determinator comparing a received state of the connection establishment request received and measured by the base station with a measurement information of the received state included in the received relay information and determining whether the relay station is used to relay radio communications with the mobile station.

The object and advantages of the invention will be realized and attained by means of the elements and combinations particularly pointed out in the claims.

It is to be understood that both the foregoing generation description and the following detailed description are exemplary and explanatory and at not restrictive of the invention.

DESCRIPTION OF EMBODIMENT

In the LTE-advanced, the introduction of the relay station (RN) is considered. The relay station has the two types: Type1 and Type2. In Type2, the relay station is not recognized by a mobile station. Therefore, when the Type2 relay station is used for the communications with a mobile station, it may be desired that the network side determines whether the relay station is to be used.

The Worldwide Interoperability for Microwave Access (WiMAX) of IEEE 802.16j where the use of the relay station is considered similar to the LTE-advanced specifies a relay station connection scheme in a case of a call (random access) of a mobile station (UE) (see, for example, IEEE P802.16j/D5, Sec. 6.3.10)

However, if a scheme similar to that in IEEE 802.16j is used in the LTE-Advance, the random access may time out due to a large delay in the connecting process with the relay station.

Therefore, in light of the above problem, an object is to provide a mobile communication system capable of rapidly connecting with the relay station.

According to an aspect of the present invention, it is possible to rapidly connect to a relay station.

In the following, embodiments are described with reference to the drawings.

System Configuration of Mobile Communication System

Figure 1:
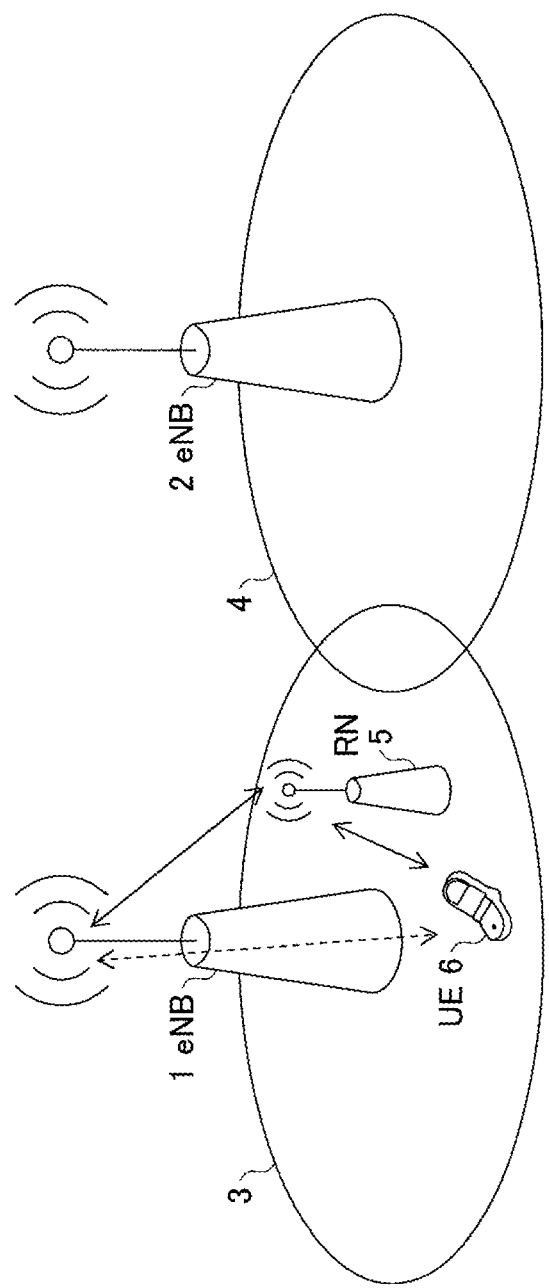
FIG. 1 is a system configuration diagram of a mobile communication system according to an embodiment.

FIG. 1 illustrates an example system configuration of a mobile communication system according to an embodiment. In FIG. 1, base stations (eNBs: evolved Nodes B) 1 and 2 form cells 3 and 4, respectively. A relay station (RN: Relay Node) 5 is located within the cell 3 of the base station 1. The relay station 5 is a Type2 relay station in the LTE-Advanced.

When a mobile station (UE: User Equipment) 6 is located near the relay station 5, the communications of user data between the mobile station 6 and the base station 1 are conducted via the relay station 5.

On the other hand, the communications of a control signal such as a random access request and a random access response between the mobile station 6 and the base station 1 are directly conducted between the mobile station 6 and the base station 1 as illustrated in the dotted line without using the relay station 5.

Random Access Operation of LTE

Figure 2:
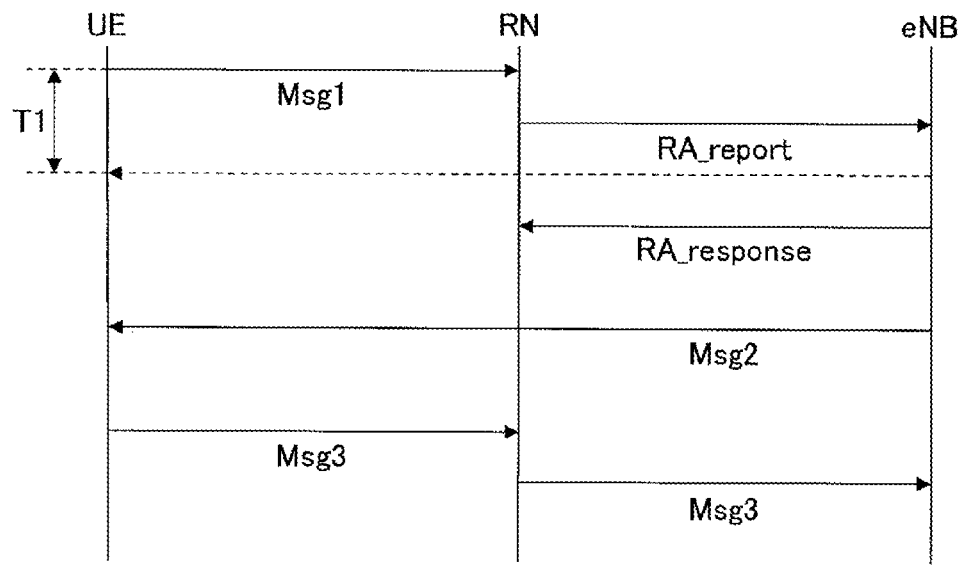
FIG. 2 is an example of a timing chart of a random access operation.

FIG. 2 is a timing chart of a random access operation assuming that the random access procedure of the LTE described in 3GPP TS36.300 V8.8.0, Sec. 10.1.5 is combined with the description of the random access of IEEE 802.16j described in IEEE P802.16j/D5, Sec. 6.3.10 and there is a relay station in the LTE.

In FIG. 2, the mobile station transmits a randomly-selected preamble to the base station as a random access request (Msg1). The relay station receives the random access request (Msg1) and measures the received level thereof. Then, the relay station reports the measurement result to the base station using an RA_report.

The base station compares the measurement result in the RA_report with the received level of the random access request (Msg1) directly received from the mobile station. Then, the base station determines whether the relay station is to be used when communicating with the mobile station.

When determining that the relay station is to be used when communicating with the mobile station, the base station reports that determination result to the relay station (using RA_response). After that, the base station communicates with the mobile station via the relay station. Further, the base station transmits a random access response (Msg2) to the mobile station.

Where there is no relay station, the random access response (Msg2) is transmitted at the timing as illustrated in dotted arrow of FIG. 2. When there is a relay station, the base station first waits for the report in the RA_report from the relay station, and then transmits the random access response (Msg2).

Therefore, the time period from the transmission of the random access request (Msg1) to the transmission of the random access response (Msg2) may become longer. On the other hand, in the specifications of the LTE, the mobile station is assumed to receive the random access response (Msg2) right after (i.e., T1 in FIG. 2) the transmission of the random access request (Msg1). Therefore, the random access process may time out.

Figure 3:
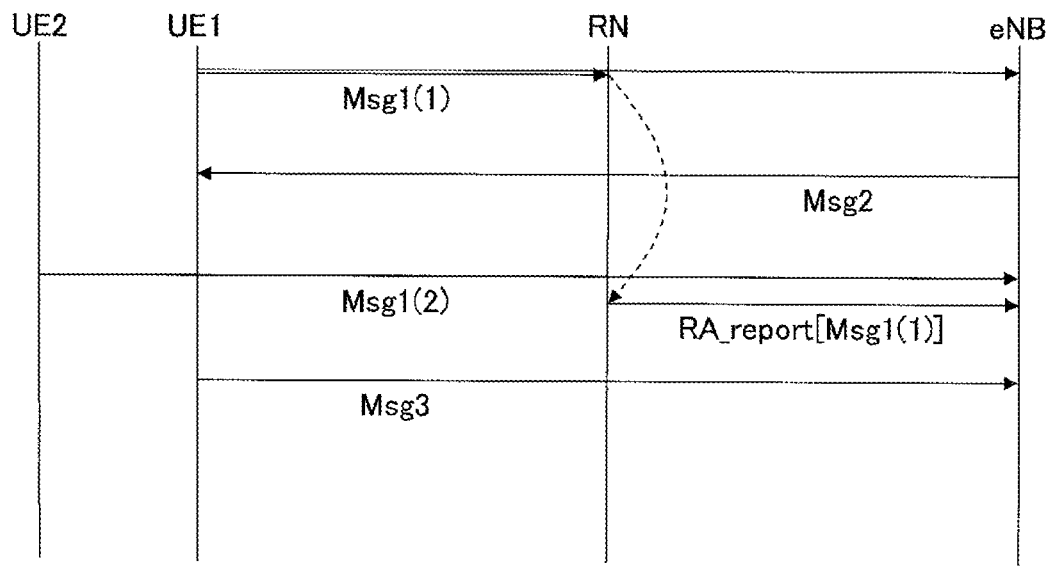
FIG. 3 is another example of the timing chart of the random access operation.

As a method of responding to such as case, it is possible to use a method in which the RA_report is transmitted after the random access response (Msg2). FIG. 3 illustrates a timing chart of this case.

In FIG. 3, the mobile station UE1 transmits a randomly-selected preamble to the base station as the random access request (Msg1(1)). Upon the receipt of the random access request (Msg1(1)) from the mobile station UE1, the base station promptly transmits the random access response (Msg2) to the mobile station UE1. After that, the relay station reports the received level of the mobile station UE1 to the base station using the RA_report.

The base station compares the received state of the random access signal (Msg1(1)) received by the base station with the received state of the random access signal (Msg1(1)) received by the relay station and transmitted from the relay station as the RA_report.

In this case, however, if a mobile station UE2 transmits the random request (Msg1) using the preamble having the same signature as that of the mobile station UE1 by chance from among 32 different signatures before the received level of the mobile station UE1 is reported from the relay station using the RA_report, the base station may not determine whether the RA_report from the relay is relevant to the mobile station UE1 or the mobile station UE2. This is because the preamble includes no information such as a provisional UE identification number that identifies the mobile station.

Embodiment

In the embodiment described below, the relay station reports the RA_report to the base station not based on the random access request (Msg1) from the mobile station but based on a connection establishment request (Msg3) from the mobile station.

Random Access Operation in LTE-Advanced

Figure 4:
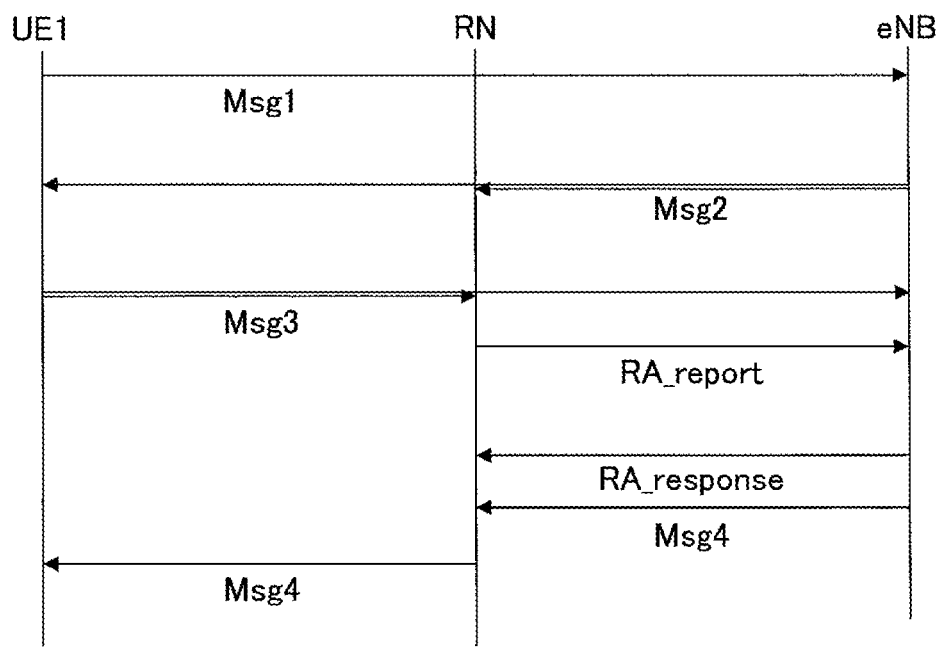
FIG. 4 is a timing chart of the random access operation according to an embodiment.

FIG. 4 is a timing chart of the random access operation according to an embodiment when there is a relay station in the LTE-Advanced. As illustrated in FIG. 4, the mobile station (UE1) transmits the preamble as the random access request (Msg1) to the base station (eNB), the preamble having a randomly-selected signature. Upon the receipt of the random access request (Msg1) from the mobile station, the base station promptly transmits the random access response (Msg2) to the mobile station.

The relay station (RN) waits for the random access response (Msg2) transmitted from the base station. The random access response (Msg2) includes information items indicating the timing when the mobile station transmits the connection establishment request (Msg3) next, the radio resources to be used, and the provisional UE identification number.

Upon the receipt of the random access response (Msg2), the relay station comes to know that the mobile station transmits the connection establishment request (Msg3) at which timing, by using which radio resources, and using which provisional UE identification number. As a result, the relay station may reliably wait for the connection establishment request (Msg3).

Upon the receipt of the random access response (Msg2), the mobile station transmits the connection establishment request (Msg3) in accordance with the information items (i.e., the timing when the connection establishment request is to be transmitted, which radio resources are to be used, and which provisional UE identification number is to be used) included in the random access response (Msg2).

The relay station waits for receiving the connection establishment request (Msg3) transmitted from the mobile station UE1. Due to the provisional UE identification number in the connection establishment request (Msg3), it becomes possible for the relay station to reliably determine the mobile station that has transmitted the connection establishment request (Msg3).

Upon the receipt of the connection establishment request (Msg3), the relay station measures the received state such as the received level, the received quality or the like, and extracts the provisional UE identification number of the mobile station out of the information items of the connection establishment request (Msg3). Then, the relay station reports the RA_report to the base station, the RA_report including the received state such as the received level, the received quality or the like and the provisional UE identification number.

The base station determines the necessity to use (whether to use) the relay station by comparing the measurement information of the received state such as the received level, the received quality or the like of the connection establishment request (Msg3), the measurement information being measured by the base station, and the measurement information of the connection establishment request (Msg3) in the RA_report, the measurement information being measured by the relay station.

More specifically, when determining that the received station of the relay station is in good condition, the base station determines to use the relay station. On the other hand, when determining that the received station of the relay station is not in a good condition, the base station determines not to use the relay station. When determining to use the relay station, the base station reports the determination result to the relay station using the RA_response, so that the communications with the mobile station later are conducted via the relay station.

Further, the base station transmits the connection establishment response (Msg4) to the mobile station and starts communications with the mobile station. The connection establishment response (Msg4) may be transmitted to the mobile station via the relay station, or may directly transmitted to the mobile station.

As described above, the relay station reports the RA_report to the base station based on the reception of the connection establishment request (Msg3) from the mobile station, the RA_report including the provisional UE identification number. Therefore, it becomes possible for the base station to reliably determine that the received RA_report is relevant to which mobile station. Further, it becomes possible to promptly and reliably determine whether the relay station is to be used or not.

Relay Station Apparatus

Figure 5:
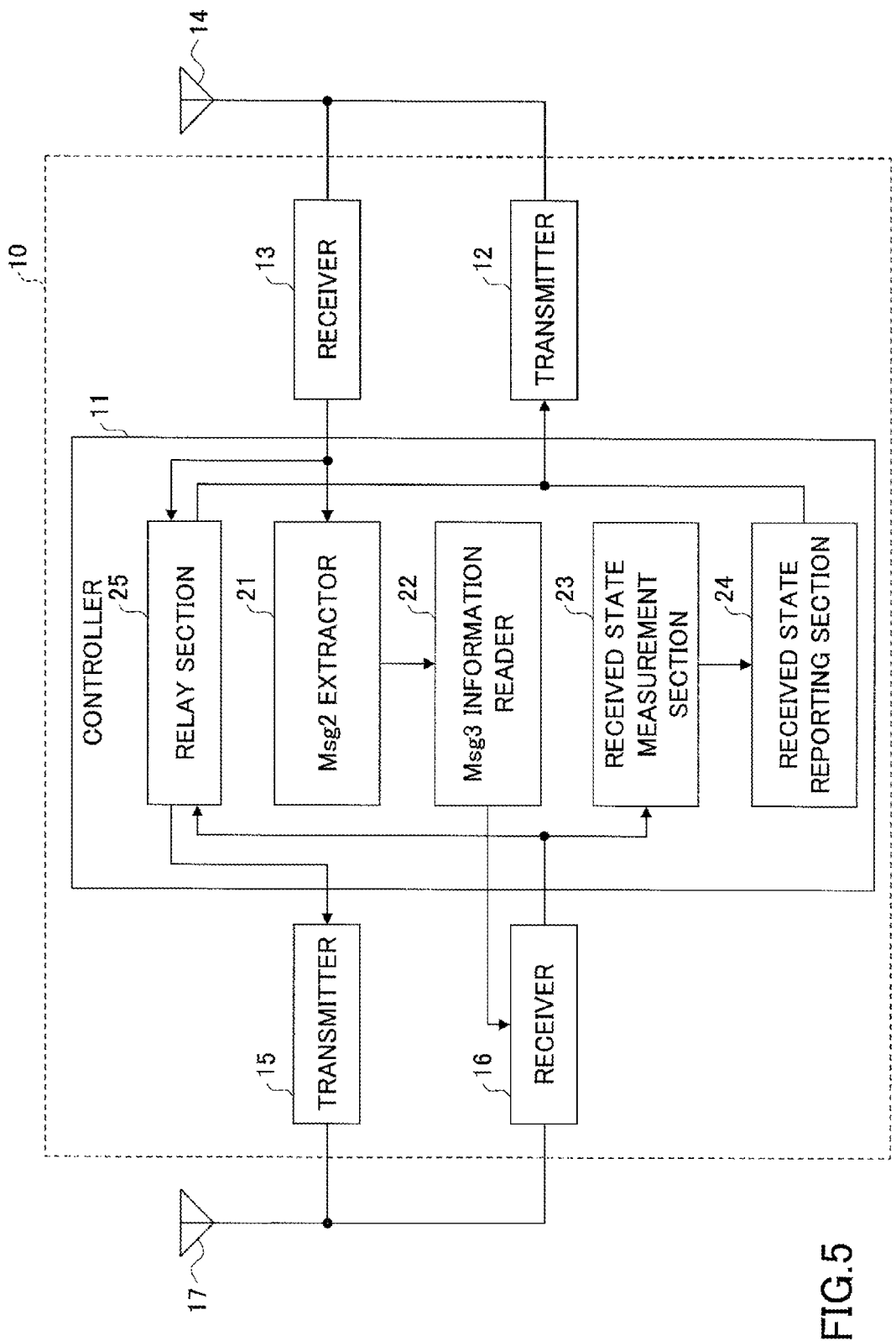
FIG. 5 is a block diagram of a relay station apparatus according to an embodiment.

FIG. 5 is a functional block diagram of the relay station apparatus according to an embodiment. Here, FIG. 5 illustrates a part where a process relevant to the random access operation is performed. As illustrated in FIG. 5, a relay station apparatus 10 includes a controller 11, and a transmitter 12, a receiver 13, and an antenna 14 for radio communications with a base station side. The relay station apparatus 10 further includes a transmitter 15, a receiver 16, and an antenna 17 for radio communications with a mobile station side.

An Msg2 extractor 21 in the controller 11 extracts the random access response (Msg2) out of the transmission signal transmitted from the base station, the transmission signal being received via the receiver 13 on the base station side. Then, the Msg2 extractor 21 supplies the extracted random access response (Msg2) to an Msg3 information reader 22.

The Msg3 information reader 22 acquires the information items indicating the timing of the connection establishment request (Msg3), the radio resources, and the provisional UE identification number included in the random access response (Msg2). Then, the Msg3 information reader 22 supplies the acquired information items to the receiver 16 on the mobile station side as receiving information.

Upon the receipt of the connection establishment request (Msg3) from the mobile station specified based on the information items indicating the timing, the radio resource, and the provisional UE identification number in the receiving information, the Msg3 information reader 22 supplies the connection establishment request (Msg3) to a received state measurement section 23 in the controller 11.

The received state measurement section 23 measures the received state by measuring the received level, the received quality or the like of the connection establishment request (Msg3). Further, the received state measurement section 23 extracts the provisional UE identification number of the mobile station. Then, the received state measurement section 23 supplies the received state and the provisional UE identification number to a received state reporting section 24.

The received state reporting section 24 generates the RA_report including the received state of the connection establishment request (Msg3) and the provisional UE identification number of the mobile station, and transmits the generated RA_report from the transmitter 12 on the base station side.

Further, with respect to a call which is reported in the RA_response included in a transmission signal received by the receiver 13 on the base station side, the RA_response indicating that it is desired to use the relay station, a relay section 25 in the controller 11 relays and transmits the signal received by the receiver 13 on the base station side to the transmitter 15 on the mobile station side.

Further, the relay section 25 relays and transmits the signal received by the receiver 16 on the mobile station side to the transmitter 12 on the base station side.

Base Station Apparatus

Figure 6:
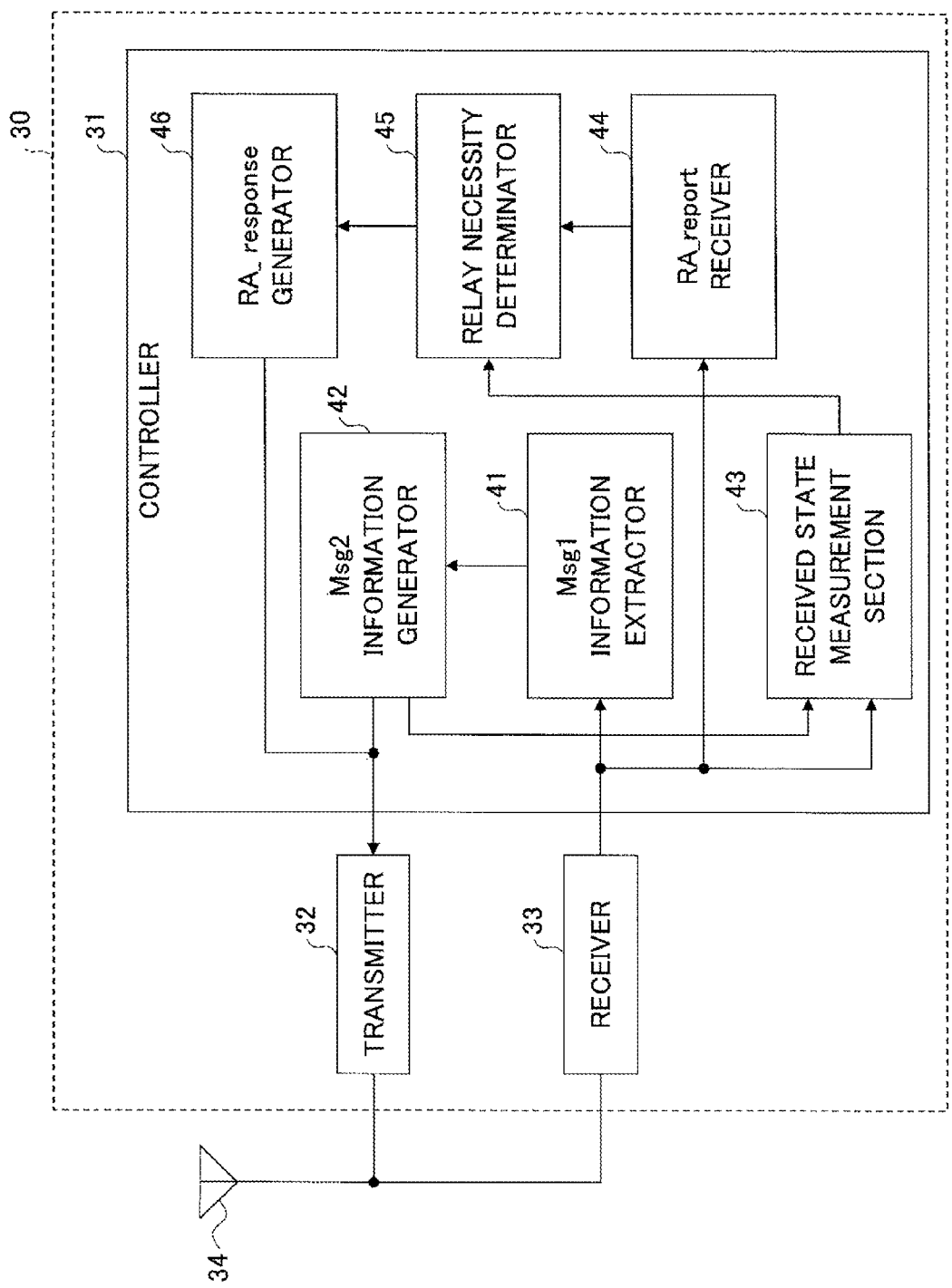
FIG. 6 is a block diagram of a base station apparatus according to an embodiment.

FIG. 6 is a functional block diagram of the base station apparatus according to an embodiment. Here, FIG. 6 illustrates a part where a process relevant to the random access operation is performed. As illustrated in FIG. 6, a base station apparatus 30 includes a controller 31, and a transmitter 32, a receiver 33, and an antenna 34 for radio communications with the mobile station or the relay station.

An Msg1 information extractor 41 in the controller 31 extracts the random access request (Msg1) out of the signal received by the receiver 33, and supplies the extracted random access request (Msg1) to an Msg2 information generator 42. In response to the received ransom access request (Msg1), the Msg2 information generator 42 generates the random access response (Msg2) so as to be transmitted from the transmitter 32.

The random access response (Msg2) includes information items indicating the signature of the random access request (Msg1), the timing when the mobile station transmits the connection establishment request (Msg3) next, the radio resource to be used, the provisional UE identification number and the like.

Further, the signal received by the receiver 33 is supplied to a received state measurement section 43. The received state measurement section 43 has received the information items from the Msg2 information generator 42, the information items indicating that the signature of the random access request (Msg1), the timing when the mobile station transmits the connection establishment request (Msg3) next, the radio resource to be used, the provisional UE identification number and the like.

The received state measurement section 43 measures the received state by measuring the received level, the received quality or the like of the connection establishment request (Msg3) transmitted from the mobile station. Then, the received state measurement section 43 supplies the measurement information of the received state along with the provisional UE identification number extracted from the connection establishment request (Msg3) to a relay necessity determinator 45.

Further, the signal received by the receiver 33 is supplied to an RA_report receiver 44. The RA_report receiver 44 extracts the RA_report transmitted from the relay station, and extracts and supplies the measurement information of the received state and the provisional UE identification number out of the RA_report to the relay necessity determinator 45.

The relay necessity determinator 45 compares the measurement information and the provisional UE identification number of the connection establishment request (Msg3) supplied from the received state measurement section 43, the measurement information being measured by the base station apparatus 30 with the measurement information and the provisional UE identification number of the connection establishment request (Msg3) supplied from the RA_report receiver 44, the measurement information being measured by the relay station.

Then, the relay necessity determinator 45 determines that it is necessary (desired) to use the relay station to communication with the mobile station if the provisional UE identification numbers are identical and the received state measured by the relay station is greater (better). On the other hand, the relay necessity determinator 45 determines that it is not necessary (desired) to use the relay station to communication with the mobile station if the provisional UE identification numbers are identical but the received state measured by the relay station is not greater (better). The relay necessity determinator 45 supplies the determination result to an RA_response generator 46.

When the determination result indicates that it is necessary (desired) to use the relay station, the RA_response generator 46 generates the RA_response instructing the relay connection (to use the relay station) with respect to the call. The generated RA_response is transmitted from the transmitter 32 to the relay station.

Mobile Station Apparatus

Figure 7:
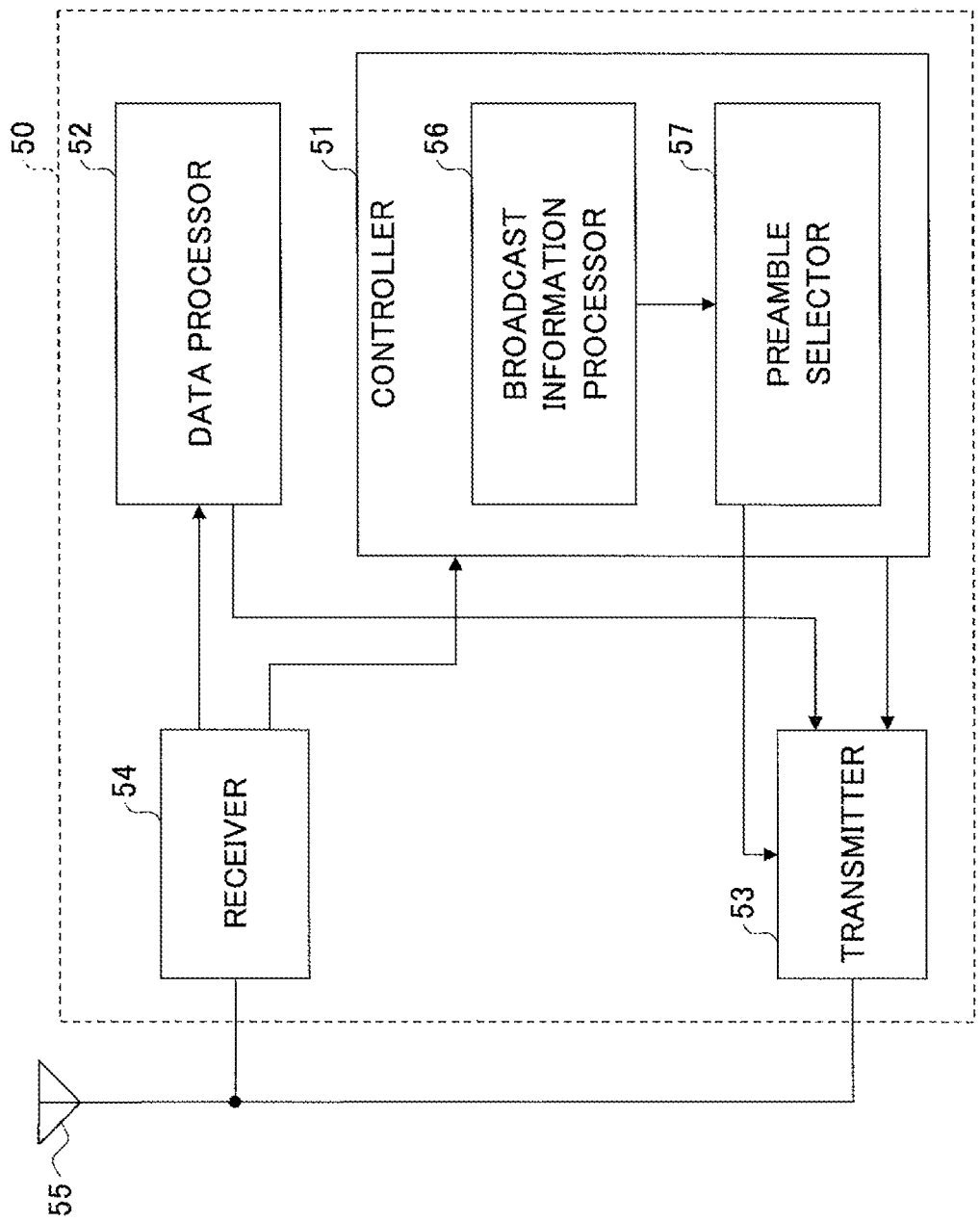
FIG. 7 is a block diagram of a mobile station apparatus according to an embodiment.

FIG. 7 is a functional block diagram of the mobile station apparatus according to an embodiment. As illustrated in FIG. 7, a mobile station apparatus 50 includes a controller 51, a data processor 52, a transmitter 53, a receiver 54, and an antenna 55 for radio communications with the base station or the relay station.

A broadcast information processor 56 in the controller 51 extracts preamble information (including plural signatures) broadcast from the base station out of the received signal by the receiver 54, and supplies the extracted preamble information to a preamble selector 57. The preamble selector 57 selects the signature to be randomly used out of the preamble information, to be transmitted from the transmitter 53 as the random access request (Msg1).

Further, upon the receipt of the random access response (Msg2) transmitted from the base station, the controller 51 sets the radio resource and the transmission timing in accordance with the contents of the random access response (Msg2), and generates a connection establishment request (Msg3) to be transmitted from the transmitter 53.

After that, the controller 51 receives the connection establishment response (Msg4) transmitted from the base station. Then, when determining that the contention resolution is successful, the communications continue. On the other hand, when determining that the contention resolution is failed, the random access starts from the beginning again.

Further, the downlink user data received by the receiver 54 are supplied to the data processor 52 to be data processed. The uplink user data output from the data processor 52 are transmitted from the transmitter 53.

Signal Format

Figure 8:
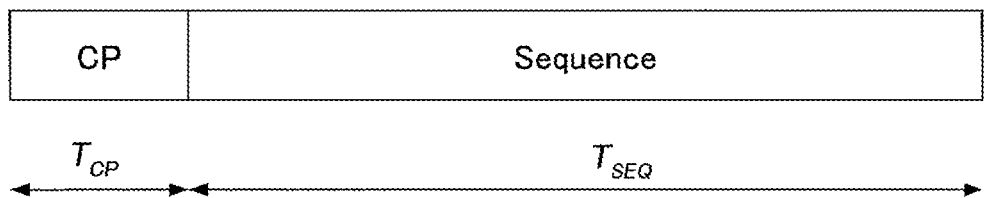
FIG. 8 is a drawing illustrating a signal format of a random access request according to an embodiment.

FIG. 8 illustrates a signal format of the random access request (Msg1) according to an embodiment. In FIG. 8, the symbol "CP" refers to Cyclic Prefix which denotes a guard section $T_{cp}$. The sequence of the section $T_{SEQ}$ following the guard section $T_{cp}$ refers to the preamble (signature).

Figure 9:
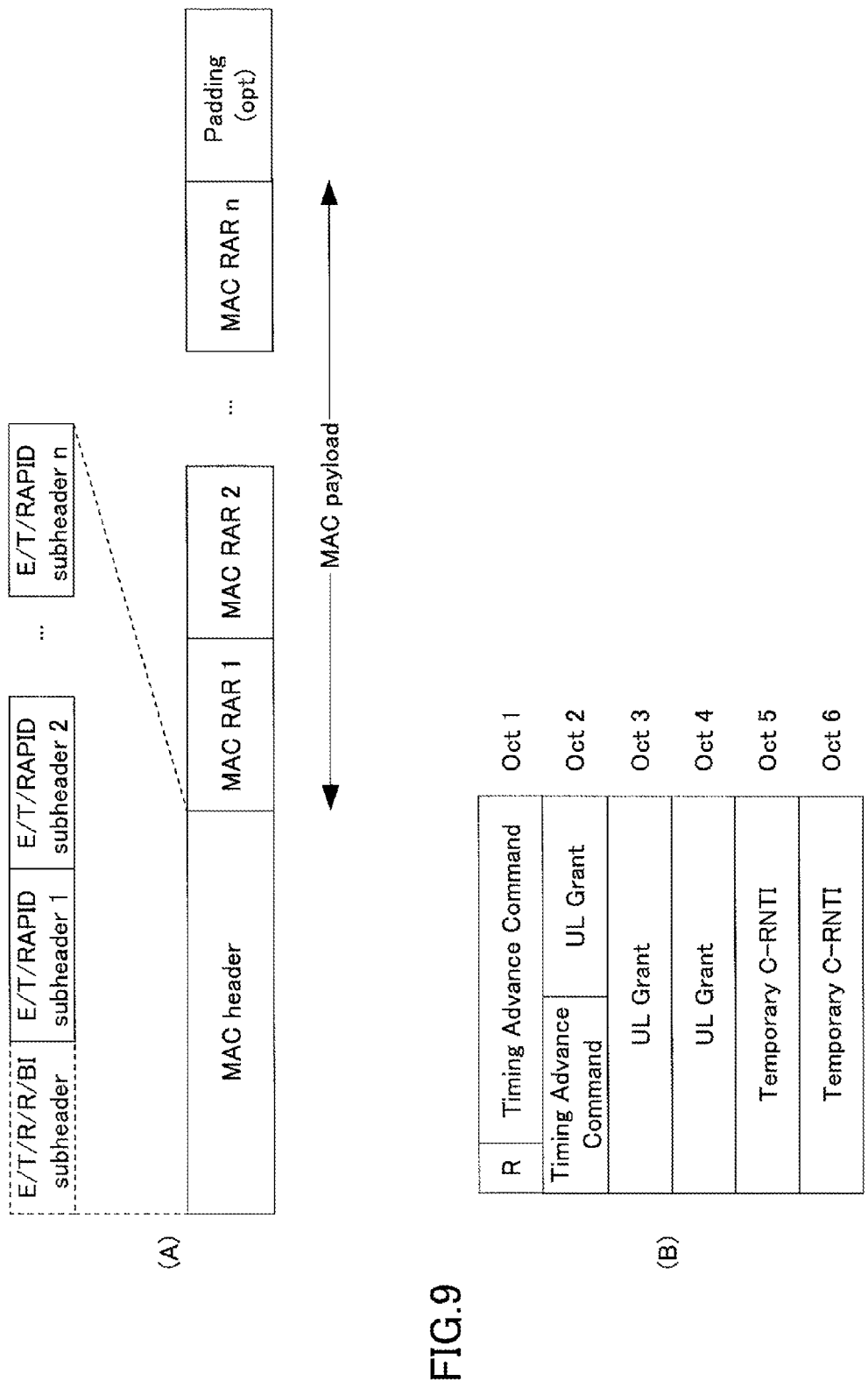
FIG. 9 is a drawing illustrating a signal format of a random access response according to an embodiment.

The parts (A) and (B) of FIG. 9 illustrate random access response (Msg2) according to an embodiment. The base station collectively performs the random access response with respect to the plural (n) random access requests (Msg1) of mobile stations received in a certain time period. To that end, there are n subheaders (E/T/RAPID subheader 1-n) where n signatures transmitted by n mobile stations in the header section (MAC header) of the random access response (Msg2) illustrated in the part (A) of FIG. 9.

Further, the payload section includes the random access responses (MAC RAR 1-n) corresponding to n mobile stations. As illustrated in the part (B) of FIG. 9, each of the random access responses (MAC RAR 1-n) has six octets provided for the timing to transmit the connection establishment request (Msg3) (Timing Advance Command), the radio resources to be used (UL Grant), and the provisional UE identification number (Temporary C-RNTI). Here, two octets (=16 bits) are provided for the provisional UE identification number.

Incidentally, the connection establishment request (Msg3) has a format similar to that of the user data in a normal state. Namely, the connection establishment request (Msg3) includes information items indicating a connection establishment request code, destination information (base station), transmission source information (provisional UE identification number), and further includes information items indicating a UE identification number unique to the mobile station (actual UE identification information) and the like.

According to the embodiment described above, by transmitting the RA_report after the transmission of the random access response (Msg2), it becomes possible to connect with the Type2 relay station rapidly. Further, it becomes possible to reliably determine the correspondence between the RA_report and the random access request (Msg1) of the mobile station. Further, it is not necessary for the relay station to always receive the random access request (Msg1). Therefore, the workload may be reduced.

In the above embodiment, the term Msg2 extractor 21 is used as an example of a transmission information acquisition unit; the term received state measurement section and the term received state reporting section are used as a relay report unit; the term relay necessity determinator 45 is used as an example of a comparison determinator; and the term RA_report receiver is used as an example of a relay report receiver.

All examples and conditional language provided herein are intended for the pedagogical purpose of aiding the reader in understanding the invention and the concepts contributed by the inventor to further the art, and not be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alteration could be made hereto without departing from the spirit and scope of the invention.

What is claimed is:

1. A mobile communication system comprising:
   a base station;
   a mobile station; and
   a relay station relaying radio communications between the base station and the mobile station,
   wherein the mobile station includes
      a transmitter configured to transmit a random access request to the base station,
   wherein the relay station includes
      a transmission information acquisition unit configured to receive a random access response transmitted from the base station in response to the random access request, and acquire transmission information of a connection establishment request to be transmitted by the mobile station out of the received random access response, and a relay report unit configured to receive the connection establishment request from the mobile station based on the transmission information, measure a received state of the received connection establishment request, and transmit relay information including measurement information of the received state to the base station after the random access response is received from the base station by the transmission information acquisition unit, and wherein the base station includes a comparison determinator configured to compare a received state of the connection establishment request received and measured by the base station with the measurement information of the received state included in the relay information received from the relay station, and determine whether the relay station is used to relay radio communications with the mobile station.

2. The mobile communication system as claimed in claim 1, wherein the relay report unit is configured to transmit the relay information including the measurement information of the received state and identification information of the mobile station that is obtained from the connection establishment request, and wherein the comparison determinator is configured to, when determining that the identification information of the mobile station included in the connection establishment request is the same as the identification information of the mobile station included in the received relay information, compare the received state of the connection establishment request received and measured by the base station with the measurement information of the received state included in the received relay information.

3. A relay control method for a mobile communication system including a base station, a mobile station, and a relay station relaying radio communications between the base station and the mobile station, the relay control method comprising:

receiving, by the relay station, a random access response transmitted from the base station in response to a random access request transmitted from the mobile station, and acquiring, by the relay station, transmission information of a connection establishment request to be transmitted by the mobile station out of the received random access response;

receiving, by the relay station, the connection establishment request from the mobile station based on the transmission information, measuring, by the relay station, a received state of the received connection establishment request, and transmitting, by the relay station, relay information to the base station after receiving the random access response from the base station, the relay information including measurement information of the received state; and comparing, by the base station, a received state of the connection establishment request received and measured by the base station with the measurement information of the received state included in the relay information received from the relay station, and determining, by the base station, whether the relay station is used to relay radio communications with the mobile station.

4. The relay control method as claimed in claim 3, wherein in the transmitting, the relay information including the measurement information of the received state and identification information of the mobile station obtained from the connection establishment request is transmitted, and wherein in the comparing, when determining that the identification information of the mobile station included in the connection establishment request is the same as the identification information of the mobile station included in the received relay information, the received state of the connection establishment request received and measured by the base station is compared with the measurement information of the received state included in the received relay information.

5. A relay station used in a mobile communication system including a base station, a mobile station, and the relay station, the relay station comprising:

a transmission information acquisition unit configured to receive a random access response transmitted from the base station in response to a random access request transmitted by the mobile station, and acquire transmission information of a connection establishment request to be transmitted by the mobile station out of the received random access response; and a relay report unit configured to receive the connection establishment request from the mobile station based on the transmission information, measure a received state of the received connection establishment request, and transmit relay information including measurement information of the received state to the base station after the random access response is received from the base station by the transmission information acquisition unit.

6. The relay station as claimed in claim 5, wherein the relay report unit is configured to transmit the relay information including the measurement information of the received state and identification information of the mobile station that is obtained from the connection establishment request.

7. A base station used in a mobile communication system including the base station, a mobile station, and a relay station relaying radio communications between the base station and the mobile station, the base station comprising:

a relay report receiver configured to receive relay information from the relay station, the relay information including measurement information of a received state of a connection establishment request received by the relay station from the mobile station; and a comparison determinator configured to compare a received state of the connection establishment request received and measured by the base station with the measurement information of the received state included in the received relay information, and determine whether the relay station is used to relay radio communications with the mobile station, wherein the measurement information is obtained by the relay station by receiving a random access response transmitted from the base station in response to a random access request transmitted from the mobile station, acquiring transmission information of the connection establishment request out of the received random access response, receiving the connection establishment request from the mobile station based on the transmission information, and measuring the received state of the received connection establishment request; and wherein the relay report receiver receives the relay information from the relay station after the random access response is transmitted by the base station.

8. The base station as claimed in claim 7,
wherein the relay information includes the measurement information of the received state, and identification information of the mobile station that is obtained from the connection establishment request, and
wherein the comparison determinator is configured to, when determining that the identification information of the mobile station included in the connection establishment request is the same as the identification information of the mobile station included in the received relay information, compare the received state of the connection establishment request received and measured by the base station with the measurement information of the received state included in the received relay information.

* * * * *